United States Patent [19]
Hampton

[11] Patent Number: 6,158,807
[45] Date of Patent: Dec. 12, 2000

[54] INFANT'S RESTRAINING SEAT

[76] Inventor: Lewis E. Hampton, Box 110, Rich Hollow Rd., Erwin, Tenn. 37650

[21] Appl. No.: 09/437,024

[22] Filed: Nov. 9, 1999

[51] Int. Cl.⁷ ..................................................... A47C 1/08
[52] U.S. Cl. .................................... 297/256.1; 297/256.1; 297/250.1
[58] Field of Search .......................... 297/250.1, 256.12, 297/344.24, 256.1, 256.16, 344.22, 254; 296/65.01, 65.06, 65.11

[56] References Cited

U.S. PATENT DOCUMENTS

| | | |
|---|---|---|
| 2,792,951 | 5/1957 | White . |
| 2,865,427 | 12/1958 | Garfield . |
| 3,051,522 | 8/1962 | Myers . |
| 3,066,979 | 12/1962 | Pitts et al. . |
| 3,094,356 | 6/1963 | Burke . |
| 3,404,917 | 10/1968 | Smith . |
| 4,733,903 | 3/1988 | Bailey . |
| 4,971,392 | 11/1990 | Young . |
| 5,524,965 | 6/1996 | Barley . |
| 5,971,479 | 10/1999 | Jacquemot et al. . |

*Primary Examiner*—Milton Nelson, Jr.

[57] ABSTRACT

A unique construction for an infant's restraining seat providing a platform adapted to rest on and be secured in position on a vehicle seat, a base laterally pivotally affixed to the platform, a slide slideably mounted on the base and supporting an infants seat, whereby the slide and infants seat attached thereto can be moved between a rearward position adjacent the back of a vehicle seat and at least one forward position on the vehicle seat and preferably locked into position thereon, and whereby thru pivoting of the restraining base the infants seat it can be aligned with and positioned adjacent a door opening of the vehicle for providing easy and safe access to the infants' seat by a person standing substantially outside the vehicle.

8 Claims, 3 Drawing Sheets

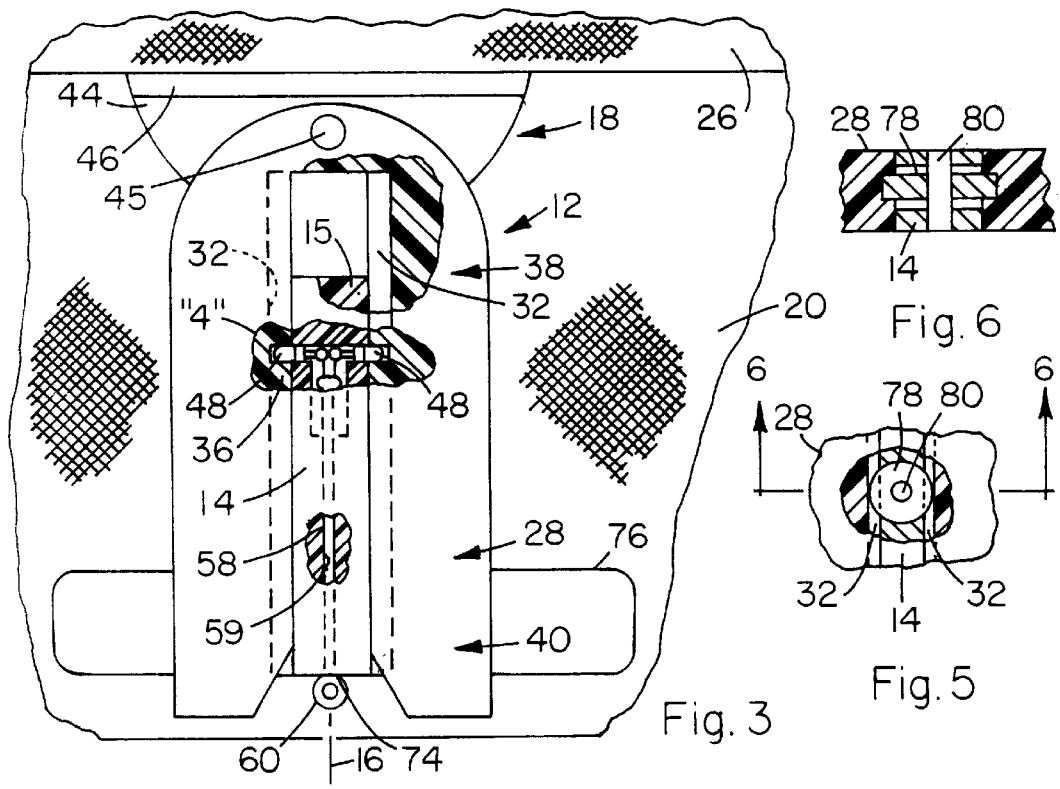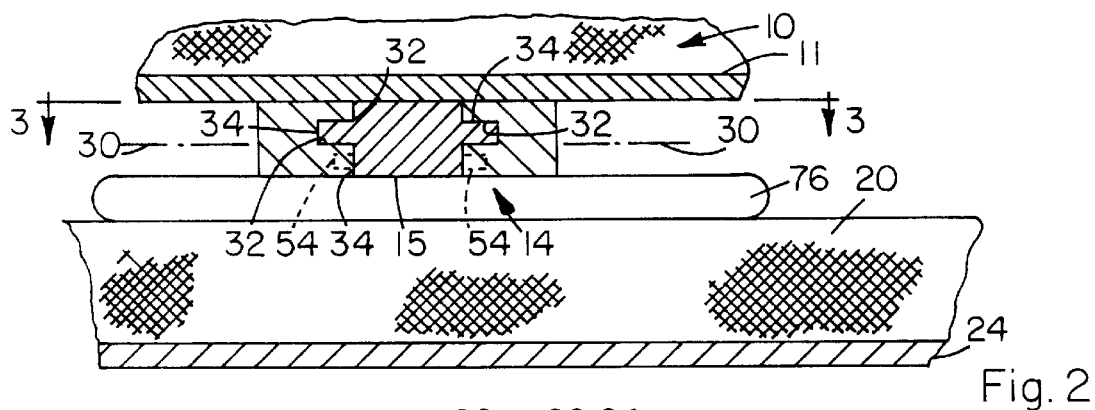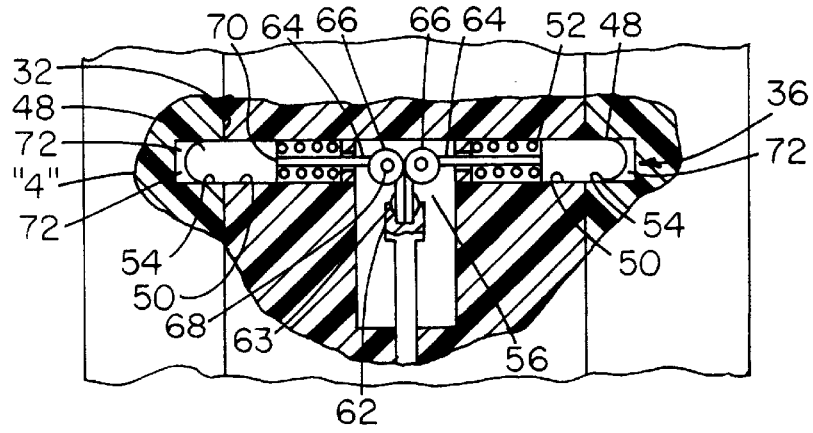

INFANT'S RESTRAINING SEAT

BACKGROUND OF THE INVENTION

1. Field

This invention concerns unique construction for an infant's restraining seat for use in vehicles such as automobiles or trucks, wherein the restraining seat can be positioned on a seat of the vehicle and anchored by a seat belt or the like to a stable portion of the vehicle such as the vehicle floor. The invention finds special utility for two door automobiles wherein the restraining seat, while still firmly connected to the auto, can be moved forwardly on the rear seat and pivoted toward the auto door opening such that the infant can be easily and safely removed from or placed into the restraining seat without causing physical distress to a person's back or shoulders or the like.

2. Prior Art

Heretofore various mechanisms have been proposed for either swiveling or reclining a restraining seat for enhancing comfort or safety of the infant. Such prior devices are shown in U.S. Pat. Nos. 5,746,478; 5,183,312; 5,277,472; 4,915,446; 4,971,392; and 5,664,830, the disclosures of which are hereby incorporated herein by reference in their entireties. No prior mechanisms are known to applicant however for actually moving the restraining sear forward in the vehicle, particularly with a pivot function, on, for example, the rear seat of a two-door automobile, without disconnecting the restraining seat from the vehicle.

BRIEF SUMMARY OF THE INVENTION

The present invention is defined in one of its broad embodiments as a unique construction for an infant's restraining seat, the construction providing a platform means for resting on a vehicle seat and to which a base means is affixed by a lateral pivot means, the base means providing slide means to which an infant's seat is attached and being adapted to slide in a direction generally longitudinally of the vehicle, between a rearward position adjacent the back of a vehicle seat and at least one forward position on said vehicle seat and locked into position thereon, and whereby thru pivoting of the base means about said pivot means said infants seat seat can be aligned with and positioned adjacent a door opening of said vehicle for providing easy and safe access thereto by a person standing substantially outside said vehicle.

In one particular preferred embodiment a reading accessibly pull mechanism is provided for operating a locking means for completely removing or releasably locking said slide means to a slide guide means provided on said base means in a desired longitudinal position on said guide means and said vehicle seat.

BRIEF DESCRIPTION OF THE DRAWINGS

The invention will be further understood from the drawings and description, wherein the various components are not to scale and some are enlarged for clarity:

FIG. 2 is a cross-sectional view taken along line 2—2 of FIG. 1 in the direction of the arrows;

FIG. 3 is a top view of the base means taken along line 3—3 of FIG. 2 in the direction of the arrows with portions broken away for clarity;

FIG. 4 is an enlarged cross-sectional view of area "4" of FIG. 3 showing the locator pins in a locked position and a retracting pull mechanism therefor;

FIG. 5 shows a variation of the slide of FIGS. 2 and 3 wherein rollers are substituted for the stabilizer fins or second shoulder means shown in FIGS. 2 and 3;

FIG. 6 is a cross-sectional view taken along line 6—6 of FIG. 5 in direction of the arrows.

DETAILED DESCRIPTION OF THE DRAWINGS

Figure 7:
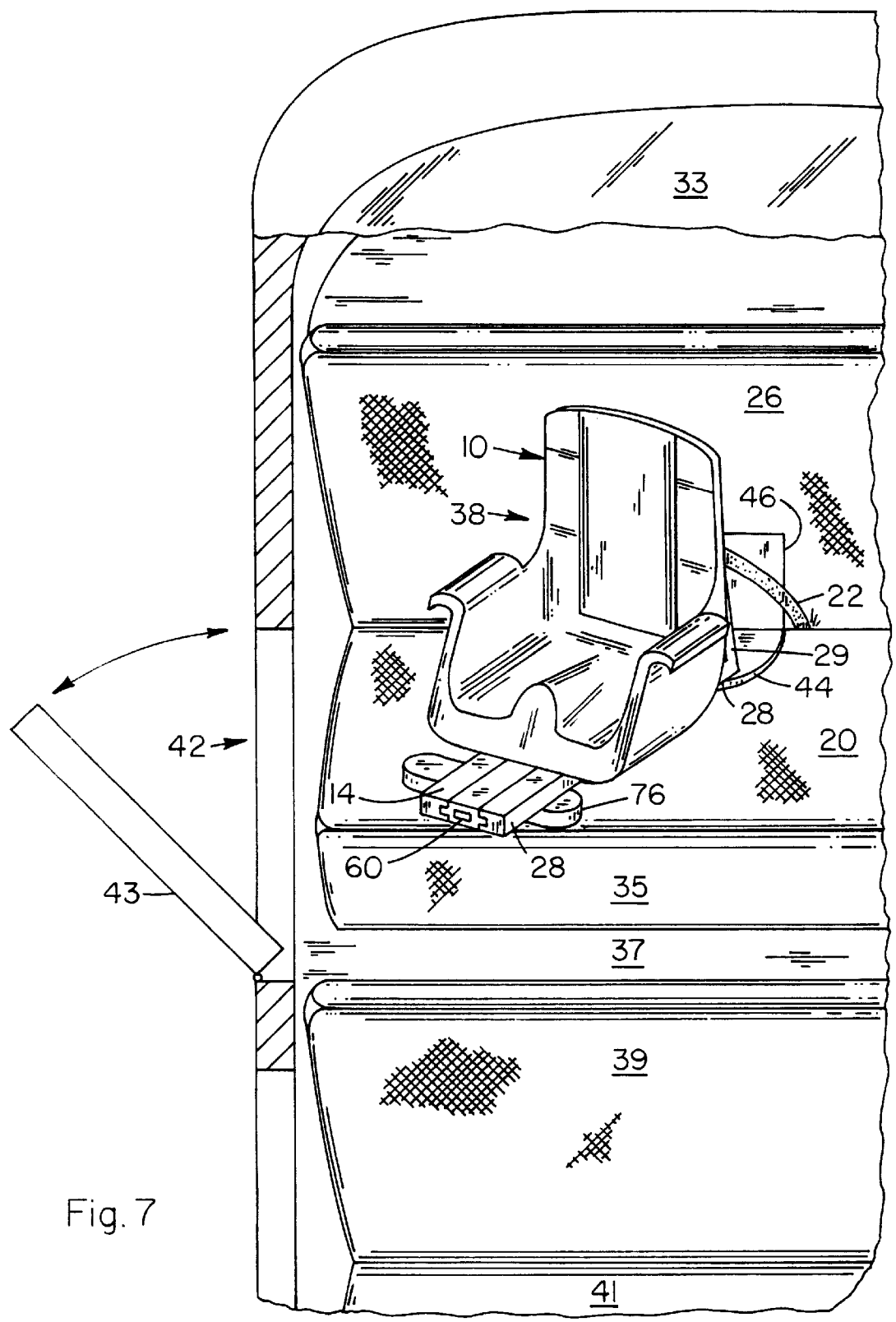
FIG. 7 is an isometric view of an embodiment of the present invention showing the restraining seat in a forward position on a vehicle rear seat.

The invention, in certain preferred embodiments, will be further understood from the following description with particular reference to the claims hereof wherein the restraining seat generally designated 10 of conventional cushion material is adapted to be affixed to a base means generally designated 12 which slidably supports slide means 14 having a longitudinal axis 16, a platform means 18 adapted to rest on a vehicle seat 20, securement means 22 on said platform means adapted to attach said platform means to a stationary section or portion such as floor 24 of said vehicle whereby said platform means can be substantially stabilized in position on said vehicle seat adjacent the back 26 thereof. The base means is formed to provide slide guide means 28 for carring slide means 14 and also having said longitudinal axis 16 guide means 28 lies in a lateral plane 30 and pivotally connected to said platform means for pivoting on said platform means substantially in said lateral plane. A longitudinally extending first shoulder means 32 is provided on said guide means, and a longitudinally extending second shoulder means 34 is provided on said slide means and interlocks with said first shoulder means to allow relative longitudinal motion but not significant vertical motion therebetween. Preferably cooperating releasable locking means generally designated 36 on said slide means and said guide means are provided whereby said slide means can be moved longitudinally of said guide means between a rearward position generally designated 38 adjacent the back 26 of said vehicle seat and at least one forward position such as 40 on said vehicle seat. Thru pivoting of base means 12 on platform means 18 restraining seat 10 can be aligned with and positioned adjacent an opening 42 of a door 43 a vehicle for easy and safe access to the restraining seat by a person standing substantially outside the vehicle. The automobile shown in FIG. 7 has rear window 33, rear seat front section 35, floor section 37, front seat 41 and seat back 39.

Figure 1:
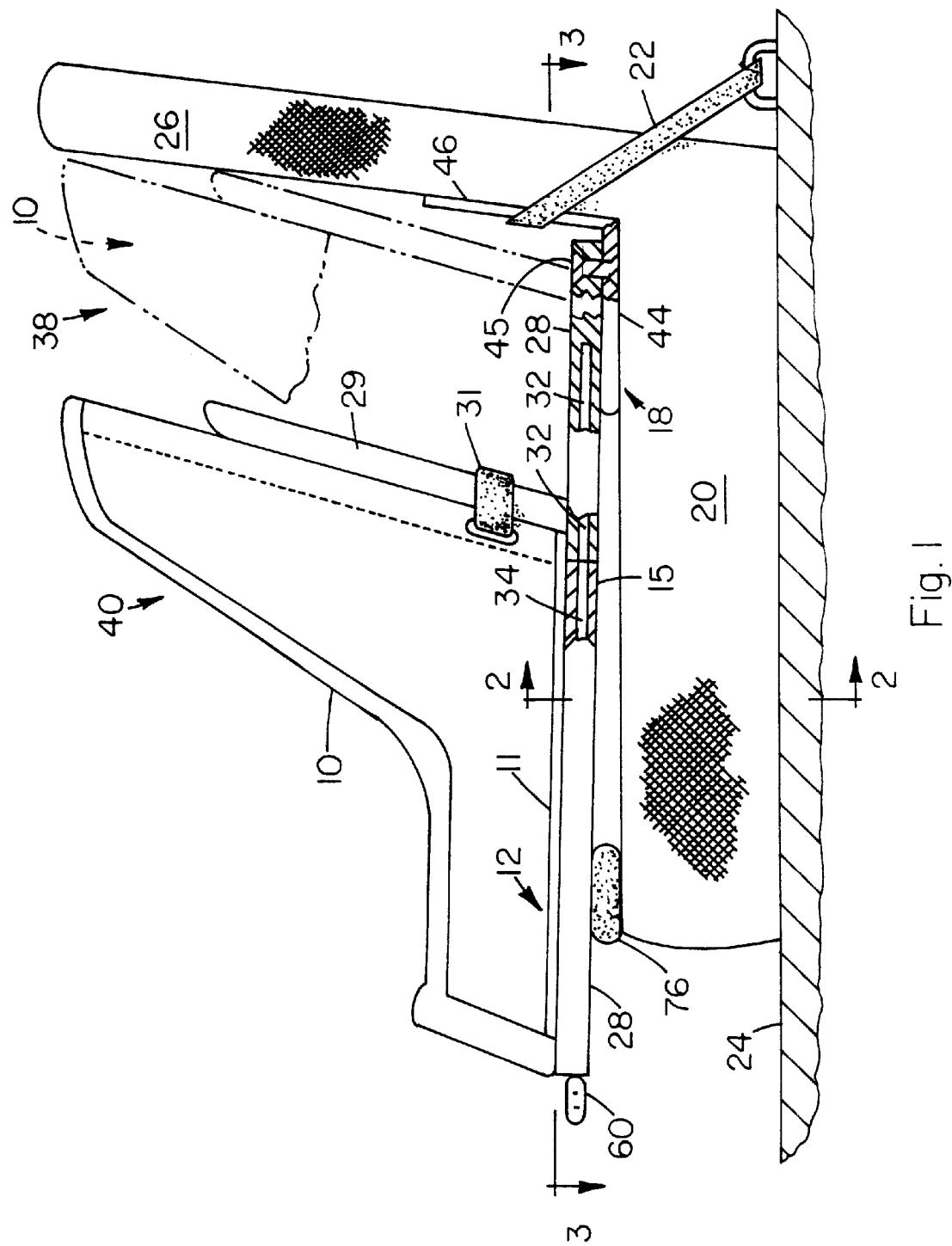
FIG. 1 is a side view, partially in longitudinal cross-section, of on preferred embodiment of the present invention.

The slide means 14 preferably has the configuration shown in FIGS. 1, 2 and 3 wherein the fins 34 of slide block 15 are readily slidable in slots 32 in the guide 28. The fins and slots are interchangeable on the guide and slide block and other configurations of such shoulders may be employed. The back 29 of slide means 14 is preferably removably affixed to seat 10 by seat belt 31 in addition to locking means 36 for additional safety and such that seat 10, i.e., the bottom 11 thereof, can be removably affixed to slide block 15 by screws or the like. This feature allows the seat 10 to be completely removed from base means 12 and used in conventional manner when desired.

The platform means 18 preferably has a bottom section 44 pivotally connected by pivot pin 45 to an upper section 46 provided with a seat belt 22 or other releasable securement device which firmly secures the platform means to a rigid section of the vehicle such as a portion of floor 24 behind and below the vehicle seat back 26.

Locking means 36, in the preferred embodiment shown comprises positioning pins 48 slidably mounted in bores 50 in slide block 15 and urged outwardly by compression springs 52. Recesses 54 longitudinally spaced at any desired interval in guide 28 are adapted to receive these pins as the slide is moved longitudinally in the guide and the pin retractor means generally designated 56 described below has been released.

Retractor means 56 preferably comprises a fairly rigid pull rod 58 such as 3/16" steel rod slidably mounted in bore 59 in block 15 and having a pull ring or the like 60 on its outer end. The inner end 62 of rod 58 is affixed by, e.g., brazing 63, to a pair of flexible cables or wires or the like 64, each of which is mounted on a pulley wheel 66 rotatable on axle 68, and connected at its inner end 70 by brazing or the like to a positioning pin 48. When the retractor means is not actuated, cables 64 are held taught around the pulley wheels by way of the bore clearances 72, the constant force of springs 52, and the rod stop provided by the outer end 74 of block 15 and ring 60.

In order to allow easy lateral pivoting of guide 28 on a car seat, one or more slide pads such as 76 may be affixed to the bottom of guide 28 and provided with a slippery surface such as silicone resin such as to slide easily on plastic, synthetic or natural fiber, or leather.

In the variation of the slide block 15 shown in FIGS. 5 and 6, the second shoulder means or fins 34 are provided by rollers 78, preferably at least two rotatably mounted on the slide block by axles 80 at any desired longitudinally spaced positions. These rollers and slots 32 are dimensioned such as to provide sufficient clearance therebetween to allow the rollers to both rotate and slide within the slots depending on which portions of the rollers is making the most frictional contact with the slots.

The invention has been described in detail with particular reference to preferred embodiments thereof, but it will be understood that variations and modifications will be effected with the spirit and scope of the invention.

I claim:

1. A construction for an infant's restraining seat unit having base means, slide means mounted on said base means for sliding motion in a substantially horizontal plane, platform means adapted to rest on a vehicle seat, and infant seat means, said base means being pivotally connected to said platform means to allow said base means to pivot on said platform means substantially in a horizontal plane, said infant seat means being mounted on said slide means for movement therewith between a rearward position adjacent a back of a vehicle seat and at least one forward position on said vehicle seat, and whereby, thou pivoting of said base means on said platform means and thru sliding of said slide means and infant seat means on said base means, said slide means and infant seat means can be aligned with and positioned adjacent a door opening of said vehicle for providing easy and safe access thereto by a person standing substantially outside said vehicle.

2. The construction of claim 1 wherein said slide means is slidably mounted in guide means on said base means, locking means is provided on said construction for locking said slide means in a desired position on said base means, and a retracting mechanism is provided on said construction for operating said locking means for completely removing or releasably locking said slide means to said base means in a desired longitudinal position in said guide means and with respect to said vehicle seat.

3. The construction of claim 2 wherein said platform means has a substantially flat surface adapted to rest on a vehicle seat, and securement means is provided on said platform means for attaching said platform means to a stationary portion of a vehicle whereby said platform means can be substantially stabilized in position on the vehicle seat adjacent the back thereof.

4. The construction of claim 2 wherein said locking means comprises cooperating positioning pin means and locking shoulder means for engaging said pin means, said pin means and shoulder means being cooperatively positioned on said slide means and guide means.

5. The construction of claim 4 wherein said locking shoulder means comprises recess means, and wherein said retracting mechanism comprises pull means affixed to said pin means for pulling said pin means out of said bore means to allow said recess means to slide within said guide means.

6. The construction of claim 2 wherein said base means has a longitudinal axis and is pivotally connected to said platform means for pivoting thereon substantially in a lateral plane, longitudinally extending first shoulder means on said guide means, longitudinally extending second shoulder means on said slide means and interlocking with said first shoulder means to allow relative longitudinal motion but not significant vertical motion therebetween, and cooperating releasable locking means on said base means and said guide means whereby said slide means can be moved longitudinally along said guide means between a rearward position adjacent the back of a vehicle seat and at least one forward position on a vehicle seat and locked into position on said guide means.

7. The construction of claim 6 wherein said first shoulder means on said guide means is provided by a longitudinally extending slot means in said base means, said locking means comprises positioning pin means as a first component laterally slidably mounted in said slide means, and recess means as a second component is provided in said base means at one or more longitudinal positions along said slot means, wherein said pin means is spring urged toward said recess means, and wherein pull means is affixed to said pin means for extracting said pin means from said recess means.

8. The construction of claim 7 wherein said pull means comprises cable means extending longitudinally along said slide means from adjacent an inner end thereof to adjacent an outer end thereof.

* * * * *